(12) United States Patent
Andersson

(10) Patent No.: US 11,519,305 B2
(45) Date of Patent: Dec. 6, 2022

(54) INTERNAL COMBUSTION ENGINE SYSTEM

(71) Applicant: VOLVO TRUCK CORPORATION, Gothenburg (SE)

(72) Inventor: Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/453,966

(22) Filed: Nov. 8, 2021

(65) Prior Publication Data

US 2022/0154604 A1 May 19, 2022

(30) Foreign Application Priority Data

Nov. 17, 2020 (EP) .................................... 20207995

(51) Int. Cl.
*F02B 75/02* (2006.01)
*F01L 1/047* (2006.01)

(52) U.S. Cl.
CPC .............. *F01L 1/047* (2013.01); *F02B 75/02* (2013.01); *F01L 2001/054* (2013.01); *F02B 2075/025* (2013.01)

(58) Field of Classification Search
CPC ........ F02B 2075/025; F02B 2075/1816; F02B 75/32; F02B 75/40; F02B 33/18; F02B 33/20; F02B 33/22; F02B 41/08; F01L 1/06; F01L 1/10
See application file for complete search history.

(56) References Cited

U.S. PATENT DOCUMENTS

| 1,466,085 | A | * | 8/1923 | Buschke | ................ | F02M 57/02 123/65 VC |
| 1,483,331 | A | * | 2/1924 | Burtnett | ................. | F02B 25/00 123/72 |
| 1,511,705 | A | * | 10/1924 | Burtnett | ................. | F02B 25/00 123/72 |
| 1,541,207 | A | * | 6/1925 | Burtnett | ................. | F02B 25/00 123/188.2 |
| 1,911,991 | A | * | 5/1933 | Cosby | .................... | F02B 25/00 123/65 VD |
| 2,139,266 | A | * | 12/1938 | Harrison | ................ | F02B 25/00 123/58.6 |
| 6,318,310 | B1 | * | 11/2001 | Clarke | ................... | F02B 41/06 123/70 R |
| 8,490,584 | B2 | | 7/2013 | Mustafa | | |
| 8,622,032 | B2 | | 1/2014 | Rez | | |

(Continued)

FOREIGN PATENT DOCUMENTS

WO 2018166591 A1 9/2018

OTHER PUBLICATIONS

European Search Report dated Feb. 26, 2021 in corresponding European Patent Application No. 20207995.0, 7 pages.

*Primary Examiner* — Hung Q Nguyen
(74) *Attorney, Agent, or Firm* — Venable LLP; Jeffri A. Kaminski

(57) ABSTRACT

An internal combustion engine system, includes a two-stroke piston machine having a cylinder for accommodating a reciprocating piston, and further at least one valve for regulating a flow of fluid medium; the ICE system further comprising a rotatable crankshaft for operating the reciprocating piston. The rotatable crankshaft comprises an integrated cam lobe arranged to operate the at least one valve of the two-stroke piston machine.

11 Claims, 5 Drawing Sheets

(56) References Cited

U.S. PATENT DOCUMENTS

| | | |
|---|---|---|
| 9,909,492 B2 | 3/2018 | Jeswine |
| 2011/0226224 A1 | 9/2011 | Dean |
| 2013/0112160 A1 | 5/2013 | Ohsawa |
| 2015/0260061 A1 | 9/2015 | Conti et al. |
| 2016/0333778 A1* | 11/2016 | Andersson ............ F02B 75/225 |
| 2017/0159514 A1 | 6/2017 | Smart et al. |
| 2017/0183989 A1 | 6/2017 | Wigsten et al. |

* cited by examiner

INTERNAL COMBUSTION ENGINE SYSTEM

TECHNICAL FIELD

The present disclosure relates to an internal combustion engine system comprising a two-stroke piston machine. The disclosure is applicable on vehicles, in particularly heavy vehicles, such as e.g. trucks. However, although the present disclosure will mainly be described in relation to a truck, the internal combustion engine system may also be applicable for other types of vehicles propelled by means of an internal combustion engine. In particular, the present disclosure can be applied in heavy-duty vehicles, such as trucks, buses and construction equipment, but also in cars and other light-weight vehicles etc. Further, the internal combustion engine is typically a hydrogen internal combustion engine.

BACKGROUND

For many years, the demands on internal combustion engines have been steadily increasing and engines are continuously developed to meet the various demands from the market. By way of example, reduction of exhaust gases, increasing engine efficiency, i.e. reduced fuel consumption, and lower noise level from the engines are some of the criteria that have become more important aspects when designing and selecting a suitable internal combustion engine (ICE) system and its engine component. Furthermore, in the field of heavy-duty vehicles, such as trucks, there are a number of prevailing environmental regulations that set specific requirements on the vehicles, e.g. restrictions relating to maximum allowable amount of exhaust gas pollution.

In order to meet at least some of the above-mentioned demands, various engine concepts have been developed throughout the years where conventional combustion cylinders have been combined with e.g. a pre-compression stage and/or an expansion stage.

One type of ICE system that has the potential to meet prevailing and future environmental regulations is a hydrogen ICE system in which the combustion of hydrogen with oxygen produces water as its only product. In such hydrogen ICE system, there is generally a compressor for pressurizing the air before entering the combustion cylinder so as to provide an appropriate mixture of hydrogen and air in the combustion cylinder when performing and completing the combustion reaction. In addition, some of these hydrogen ICE systems typically include an expander for expanding the exhaust gases arising from the combustion reaction.

Moreover, the engine cycle in a hydrogen ICE system may vary for different types of engine concepts. In a four-stroke engine, the cylinder performs four strokes in a cycle, i.e. intake, compression, power and exhaust. For example, in a four-stroke internal combustion engine working by e.g. the conventional Otto cycle or the Diesel cycle, each cylinder in the engine performs four strokes per cycle. Thus, each power stroke results in two revolutions of the crank shaft. In contrast, a two-stroke engine completes a power cycle with two strokes of the cylinder during only one crankshaft revolution, as the end of the power stroke and the beginning of the compression stroke happen simultaneously, and the intake and exhaust functions occurring at the same time.

It would be desirable to further improve the operations of an ICE system using a two-stroke machine to meet the prevailing demands and the increased need in the industry for efficient ICE systems.

SUMMARY

An object of the invention is to provide an improved internal combustion engine system comprising a two-stroke piston machine, in which at least one valve of the two-stroke piston machine can be operated in an efficient and responsive manner without compromising the overall size of the ICE system. The object is at least partly achieved by the described system.

According to a first aspect of the disclosure, there is provided an internal combustion engine (ICE) system comprising a two-stroke piston machine having a cylinder for accommodating a reciprocating piston and at least one valve for regulating a flow of fluid medium. The ICE system further comprises a rotatable crankshaft for operating the reciprocating piston. Moreover, the rotatable crankshaft comprises an integrated cam lobe arranged to operate the at least one valve of the two-stroke piston machine.

In this manner, it becomes possible to drive the valve of the two-stroke piston machine directly via the crankshaft of the ICE system, thereby providing a system in which there are no or at least fewer hydraulic or pneumatic valve actuation devices, as compared to other more advanced systems. In addition, the ICE system according to the present disclosure allows for eliminating the need of a camshaft drive as generally used in a conventional internal combustion engine. The present disclosure is particularly useful over camshaft driven systems for ICE system with few cylinders and fast valve action since that may create high positive/negative torque, that may generate gear rattle in the camshaft drive of such prior art systems. Hence, it becomes possible to reduce the number of components of the ICE system and thus generally also reduce the weight of the ICE system.

To this end, the ICE system can be made more compact, in particular with respect to ICE systems having an expander. More specifically, as the rotatable crankshaft can operate the at least one valve of the expander by means of the integrated cam lobe, the total height of the ICE system can be lowered as compared to a prior art system, in which valves, such as inlet valves, are controlled and operated by camshafts and cams located on other parts in the ICE Moreover, as the ICE system may include less moveable components compared to more conventional ICE systems, due to that the integrated cam lobe is provided on the crankshaft and configured to operate the valve of the two-stroke piston machine, the ICE system according to the present disclosure may also reduce parasitic losses in the ICE resulting from the use and wear of such additional moveable components.

Typically, the integrated cam lobe may be arranged to mechanically operate the at least one valve of the two-stroke piston machine. By way of example, the integrated cam lobe is arranged to mechanically operate the at least one valve by means of an intermediate member displaceable arranged between the integrated cam lobe and the at least one valve. In this manner, there is provided an even more simple, yet robust and compact operation of the valve by means of the crankshaft. The intermediate member may e.g. be a conventional cam follower, rocker arm or the like.

The integrated cam lobe may be integrally formed with the crankshaft. Alternatively, the integrated cam lobe may be mounted on the crankshaft. The crankshaft may include a number of integrated cam lobes. In one example embodiment, the crankshaft comprises a single integrated cam lobe. The cam lobe of the crankshaft is generally arranged on the crankshaft so that a rotation of the crankshaft provides the cam lobe to operate the valve between an open position and a closed position relative the two-stroke piston machine cylinder. Further, the cam lobe is arranged on the crankshaft to rotate at the crankshaft speed.

Typically, the crankshaft is rotatable about a longitudinal axis and having at least one integrated cam lobe arranged thereon for rotation therewith. As such, the at least integrated one cam lobe is driven in rotation about the longitudinal rotational axis of the crankshaft and further engageable with a displaceable intermediate member in the form of cam follower for operating the valve of the two-stroke piston machine.

The present disclosure is particularly useful for a hydrogen internal combustion system. In such hydrogen ICE system, the combustion of hydrogen with oxygen produces water as its only product. In addition, hydrogen can be combusted in an internal combustion engine over a wide range of fuel-air mixtures. While a hydrogen ICE system may be operated to produce low emissions during certain conditions, the amount of NOx emission may at least partly depend on the air/fuel ration, the engine compression ratio as well as the engine speed and the ignition timing. In addition, combustion of air/fuel in a hydrogen ICE system may pose higher demands on the strength and size of the engine components compared to e.g. a traditional gasoline engine.

The type of fluid medium generally depends on the type of the two-stroke machine. The fluid medium regulated by the at least one valve may in some examples be oxygen, such as compressed air. Hence, by way of example, the at least one valve is arranged to regulate the flow of fluid medium, such as compressed air, into a cylinder of the two-stroke piston machine. However, the fluid medium regulated by the at least one valve may also be exhaust gases.

While the present disclosure may be used in any type of ICE system comprising a two-stroke piston machine, the present disclosure is particularly suitable for an ICE system comprising a two-stroke piston machine in the form of an expander. Hence, according to one example embodiment, the two-stroke machine is an expander. In one example embodiment, the ICE system is a hydrogen ICE system and the two-stroke machine is an expander. Accordingly, the at least one valve is arranged to regulate the flow of exhaust gases into the cylinder of the expander.

In an ICE system with an expander, the expander may e.g. have four intake valves. The intake valves need to be opened and closed in fast and responsive manner. This is due to the fact that it is an expander, in which the expander cylinder is generally filled with fluid medium at top dead centre (TDC). Subsequently, when the piston of the expander has displaced about 10% of it stroke, the valves are generally controlled to be set in a closed position. Accordingly, the remaining 90% of the piston stroke is expansion. In this context, fast valve movement creates high forces, which in turn creates high torque on a camshaft. Firstly, there is created a negative torque to open the valve, and subsequently, when the valves close, the spring will create a positive torque on the camshaft. Such positive torque on the camshaft generally creates gear rattle in the gears driving the camshaft. Thus, by the ICE system according to the present disclosure, in which there is provided a crankshaft with at least one integrated cam lobe for operating at least one inlet valve of the expander, the problem of positive torque can be eliminated because there are no gears involved. Rather, the valve spring energy is typically dissipated directly to a flywheel of the ICE system. In this manner, it becomes possible to reduce parasitic losses and also to provide a simple and light, yet more quiet ICE system than conventional ICE system with camshafts.

In an example embodiment where the two-stroke piston machine is an expander, the cylinder is an expander cylinder and the reciprocating piston is an expander piston. Generally, the expander comprises a two-stroke expansion cylinder having an expansion piston drivingly connected to the crankshaft of the engine. In the context of the present disclosure, the term "two-stroke piston machine" typically refers to a machine arranged to perform a full-stroke cycle during one crankshaft revolution.

According to at least one embodiment, the integrated cam lobe of the crankshaft is arranged to operate an intake valve of the expander. Typically, the integrated cam lobe of the crankshaft is arranged to operate the intake valve of the expander between an open position and a closed position so as to regulate the flow of fluid medium into the expander cylinder. The intake valve is generally biased by a spring toward the normally closed valve position, and can be driven by means of the cam lobe on the crankshaft so as to overcome the biasing force of the spring toward the open valve position. The arrangement of the valve relative the expander cylinder may be provided in several different ways, as is commonly known in the art.

According to at least one embodiment, the integrated cam lobe of the crankshaft is arranged to simultaneously operate a pair of intake valves of the expander. Also, as mentioned above, the crankshaft may comprise a plurality of cam lobes for operating a plurality of pairs of intake valves of the expander. Hence, according to at least one embodiment, the crankshaft comprises a plurality of integrated cam lobes.

According to at least one embodiment, the crankshaft comprises two integrated cam lobes arranged to operate two pairs of intake valves (i.e. four intake valves are operated by the two pairs of intake valves).

According to at least one embodiment, the two-stroke piston machine is a side-valve two-stroke piston machine. In such arrangement, the inlet valve is located at a side portion of the cylinder of the two-stroke piston machine. That is, the inlet valve is located at a side portion of an axis of the cylinder of the two-stroke piston machine. Further, the side intake valve is opened and closed by the integrated cam lobe of the crankshaft, wherein the crankshaft extends perpendicular to the axis of the cylinder of the two-stroke piston machine, and thus perpendicular to the inlet valve located at the side portion of the axis of the cylinder of the two-stroke piston machine.

Analogously, in the side-valve two-stroke piston machine, the exhaust valve may also be located at a side portion of the cylinder of the two-stroke piston machine.

According to at least one embodiment, the intake valve of the expander is a side valve arranged at a side of the expander piston, whereby the integrated cam lobe of the crankshaft is arranged to drive the side valve of the expander. Typically, although not strictly required, the side valve is a valve configured to be set in the open position by displacement of the valve away from expander. Alternatively, the side valve is a valve configured to be set in the open position by displacement of the valve against the expander.

As mentioned above, the rotatable crankshaft is arranged to operate the reciprocating piston of the two-stroke machine. However, as will be readily appreciated from the following disclosure, the rotatable crankshaft can operate the reciprocating piston in several different ways. Typically, the rotatable crankshaft may be connected to a connecting rod of the reciprocating piston of the two-stroke machine. Hereby, the rotatable crankshaft is arranged to operate a connecting rod of the reciprocating piston of the two-stroke machine. However, the rotatable crankshaft may also operate the reciprocating piston in other ways, as will be further described below.

The ICE system may typically comprise at least one combustion cylinder configured for combustion of a gaseous fuel (such as hydrogen) within a combustion chamber of the combustion cylinder assembly such as to drive the crankshaft. Hence, according to at least one embodiment, the ICE system further comprises at least one combustion cylinder housing a combustion piston. In this embodiment, the combustion cylinder is configured to be energized by forces of combustion. Moreover, the ICE system comprises a compressor cylinder housing a compressor piston. Generally, the compressor cylinder is configured to compress a volume of air and transfer the compressed air to the at least one combustion piston. Further, if the expander cylinder is configured to receive exhaust gases from the at least one combustion piston. To this end, the crankshaft is generally connected to the at least one combustion piston and any one of the expander piston and compressor piston by a corresponding connecting rod. By way of example, the crankshaft is driven by the at least one combustion piston by means of a combustion piston connecting rod and also driven by the expander piston by means of an expander piston connecting rod, while the compressor piston is driven by the crankshaft by means of the expander piston. That is, in one embodiment, the crankshaft is connected to the at least one combustion piston and the expander piston by a respective connecting rod. In other words, the expander piston connecting rod transfers the reciprocating motion of the compressor piston and the expander piston to a rotational motion of the crankshaft.

By way of example, the crankshaft is driven by the at least one combustion piston by means of the combustion piston connecting rod, and is driven by the expander piston by means of the expander piston connecting rod, wherein the compressor piston is driven by the crankshaft by means of the expander piston.

Alternatively, the crankshaft is connected to the at least one combustion piston by a connecting rod and also to the compressor piston by a connecting rod, whereas the expander piston is connected to the crankshaft by a connecting element assembly extending between the compressor piston and the expander piston.

Typically, the crankshaft is driven, i.e. receives power from, the combustion cylinder and combustion piston due to forces of combustion, and from the expander cylinder and expander piston due to forces of expansion. Moreover, the crankshaft drives, i.e. deliver power to, the compressor piston and the compressor cylinder in order to compress the air. Thus, the crankshaft is rotatably driven by power pistons, i.e. at least the at least one combustion piston and the expander piston, by means of connecting rods, and the crankshaft drives power consuming pistons, i.e. at least the compressor piston, by means of the connecting rods already existing and used for the power pistons. In other words, and according to one embodiment, the ICE system comprises connecting rods only directly connected to the power pistons, i.e. the at least one combustion piston and the expander piston.

It should be understood that at least one combustion piston is arranged inside the at least one combustion cylinder, and is adapted for reciprocating motion therein. Correspondingly, the compressor piston and the expander piston are arranged inside the compressor cylinder and the expander cylinder, respectively, and are adapted for reciprocating motion therein. Moreover, a "downward" stroke of the compressor piston is referred to a stroke of the compressor piston in which the air in the compressor cylinder is compressed. Correspondingly, an "upward" stroke of the compressor piston is referred to a stroke of the compressor piston in the opposite direction. Moreover, the expander piston may generally be rigidly connected to the compressor piston so as to permit that the expander piston can move in unison with compressor piston. In such configuration, the downward and upward strokes of the compressor piston coincides with the respective strokes of the expander piston.

According to at least one embodiment, the compressor piston is connected to the crankshaft via the expander piston, such that a rotational motion of the crankshaft is transferred into a reciprocating motion of the compressor piston via the expander piston connecting rod. Thus, according to at least one embodiment, the expander piston and the compressor piston are arranged with a common connecting rod. That is, the compressor piston is connected to the crankshaft via the expander piston connecting rod. In other words, the crankshaft is driven by the at least one combustion piston via its connecting rod, i.e. a combustion piston connecting rod, and is driven by the expander piston via its connecting rod, i.e. an expander piston connecting rod.

According to at least one embodiment, the expander piston has a circular cross section extending in a first geometrical plane, and the compressor piston has a circular cross section extending in a second geometrical plane. Further, the first and second geometrical planes are positioned in a parallel configuration on opposite sides of a longitudinal axis of the crankshaft.

According to at least one embodiment, the expander cylinder and the compressor cylinder are co-axially arranged.

According to at least one embodiment, the ICE system further comprises a connecting element assembly rigidly connecting the compressor piston and the expander piston such that the compressor piston and the expander piston can move in unison. By means of the connecting element assembly, there is provided a mechanically stiff connection between the expander piston and the compressor piston, thus increasing the mechanically stability of the internal combustion engine. Since the expander piston and the compressor piston are rigidly connected to each other, the total height of the expander piston and the compressor piston can be further lowered compared to a design in which the expander piston and the compressor piston are not rigidly connected to each other. Moreover, as the expander piston is rigidly connected to the compressor piston by the connecting element assembly and thereby move in unison with compressor piston, the downward and upward strokes of the compressor piston coincides with the respective strokes of the expander piston.

According to one embodiment the expander piston has an expander piston height and an expander piston diameter, and wherein the expander piston height is smaller than ⅓ of the expander piston diameter, preferably smaller than ⅕ of the expander piston diameter, or more preferably smaller than ¹/₁₀ or ¹/₁₅ of the expander piston diameter. According to one embodiment, the compressor piston has a compressor piston height and a compressor piston diameter, and wherein the compressor piston height is smaller than ⅓ of the compressor piston diameter, preferably smaller than ⅕ of the compressor piston diameter, or more preferably smaller than ¹/₁₀ or ¹/₁₅ of the compressor piston diameter. It should be understood that the height of the respective piston is often referred to as the skirt of the piston, and that the diameter of the expander piston is typically the diameter of the expansion volume facing surface, and the diameter of the compressor piston is typically the diameter of the compression volume facing surface. According to one example embodiment, the diameter of the compressor piston is smaller compared to the diameter of the expander piston. For example, the diameter of the compressor piston is between ½ to 1/99 of the diameter of the expander piston, such as e.g. about ⅔ of the diameter of the expander piston.

According to one embodiment, the compressor piston, the expander piston and a portion of the crankshaft are arranged along a geometrical axis, and wherein the portion of the crankshaft is arranged along the geometrical axis in between the compressor piston and the expander piston. Hereby, an even more compact design of the internal combustion engine can be achieved. The portion of the crankshaft can be described as being intermediary of the expander piston and the compressor piston. The portion of the crankshaft may e.g. be a segment of the crankshaft along a longitudinal direction of the crankshaft.

According to one embodiment, a reciprocating motion of the expander piston inside of the expander cylinder occurs along an expander axis, and a reciprocating motion of the at least one combustion piston inside the combustion cylinder occurs along a combustion axis. According to one embodiment, the geometrical axis coincides with the expander axis and the compressor axis.

According to one embodiment, the compressor piston, the expander piston and the portion of the crankshaft are arranged in a geometrical plane extending at least along one of the expander axis and the compressor axis, and perpendicular to a longitudinal axis of the crankshaft, wherein the portion of the crankshaft is arranged in the geometrical plane in a direction perpendicular to the longitudinal axis of the crankshaft between the compressor piston and the expander piston.

According to one embodiment, at least a portion of the compressor piston, at least a portion of the expander piston and at least a portion of the connecting element together form a compressor-expander arrangement surrounding the portion of the crankshaft. According to one embodiment, the compressor-expander arrangement encloses, or encompasses, the portion of the crankshaft.

Thus, a compact design of the internal combustion engine can be achieved. Stated differently, at least a portion of the expander piston, at least a portion of the connecting element, and at least a portion of the compressor piston may form a geometrical frustum, or geometrical cylinder, which surrounds, or houses or encloses, the portion of the crankshaft. Stated differently, the expander piston may comprise at least an expander volume facing surface, and a crankshaft facing surface, and correspondingly the compressor piston may comprise at least a compressor volume facing surface, and a crankshaft facing surface, wherein the portion of the crankshaft is arranged in between the respective crankshaft facing surfaces.

According to one embodiment, the expander piston has a circular cross section extending in a first geometrical plane, and the compressor piston has a circular cross section extending in a second geometrical plane, the first and second geometrical planes being positioned in a parallel configuration on opposite sides of a longitudinal axis of the crankshaft.

It should be noted that the pistons may not be entirely circular in their respective cross section due to considerations of thermal expansion of the pistons. Thus, the expander piston cross section may be referred to as a round or elliptical cross section, extending perpendicular to the expander axis (i.e. the expander axis extends perpendicular into the cross section), and the compressor piston cross section may be referred to as a round, or elliptical cross section, extending perpendicular to the compressor axis (i.e. the compressor axis extends perpendicular into the cross section), and wherein the portion of the crankshaft is arranged between the cross section of the expander piston and the cross section of the compressor piston.

According to one embodiment, the expander cylinder and the compressor cylinder are co-axially arranged. Thus, alignment of the expander cylinder and the compressor cylinder inside the respective cylinder are facilitated. According to one embodiment, the crankshaft is located closer to the compressor cylinder compared to the expander cylinder. According to one embodiment, the combustion piston connecting rod is coupled to the crankshaft (i.e. the large end of the connecting rod) on the same crankshaft side as the expander connecting rod, opposite to the compressor piston. Hereby, the risk of colliding of internal components is reduced. Thus, an even more compact design of the ICE system can be achieved.

According to one embodiment, the expander cylinder and the compressor cylinder are offset compared to each other. That is, the expander axis and the compressor axis are parallel, but not coinciding.

According to one embodiment, a reciprocating motion of the expander piston inside of the expander cylinder occurs along an expander axis, and a reciprocating motion of the at least one combustion piston inside the combustion cylinder occurs along a combustion axis, and wherein the expander cylinder and the at least one combustion cylinder is arranged inside the internal combustion engine in such way that the expander axis is angled in relation to the combustion axis by between 40 degrees and 90 degrees, preferably between 50 degrees and 75 degrees, and more preferably between 55 degrees and 65 degrees, such as e.g. about 60 degrees.

Thus, the internal components, such as e.g. the various pistons and corresponding connecting rods with their reciprocating and/or rotational motions, can be adapted to be kept out of the way from each other as they move internally inside the internal combustion engine. Hereby, the internal combustion engine may be made compact. The at least one combustion cylinder may thus be described as protruding laterally from the crankshaft compared to the expander cylinder.

According to one embodiment, the expander piston connecting rod and the combustion piston connecting rod are coupled to the crankshaft by a respective crank pin. Thus, the expander piston and the at least one combustion piston may individually be phased relative each other in relation to the crankshaft. Hereby, an even distribution of torque pulses can be achieved. According to one embodiment, the expander piston connecting rod and the combustion piston connecting rod are coupled to the crankshaft by the same crank pin.

According to one embodiment, the expander piston is physically separated from the compressor piston by the connecting element. That is, the expander piston and the compressor piston are not a common piston, but rather two separate pistons rigidly connected by the connecting element. Thus, the expander piston, the compressor piston and the connecting element may be referred to as a compressor-expander arrangement in which the two pistons are rigidly connected to each other by the connecting element. The expander piston, the compressor piston and the connecting element may according to one embodiment be made in one piece, and/or be comprised in one single unit.

According to one embodiment, the at least one combustion cylinder is a first combustion cylinder and the combustion piston is a first combustion piston, and the internal combustion engine further comprises a second combustion cylinder housing a second combustion piston, the second combustion cylinder being configured to be energized by forces of combustion. Thus, the at least one combustion cylinder may be referred to as at least two combustion cylinders. The second combustion piston is according to one embodiment connected to the crankshaft via a connecting rod. That is, the first and the second combustion pistons are connected to the same crankshaft. It should be understood that the at least one combustion cylinder, or the at least two combustion cylinders, is according to one embodiment at least partly arranged between the expander piston and the compressor piston. For example, the connecting rod(s) of the combustion cylinder(s) may be arranged between the expander piston and the compressor piston. According to one embodiment, the first and second combustion cylinders operate in a four-stroke configuration, and each one of the compressor and expander cylinders operate in a two-stroke configuration. According to one embodiment, the first and second combustion cylinders operate in common in a four-stroke configuration. According to one embodiment, the first and second combustion cylinders each operates in a two-stroke configuration. According to one embodiment, the first and second combustion cylinders each operate in a four-stroke configuration.

Thus, the overall stroke of the ICE may be referred to as an eight-stroke engine (the respective two-stroke configuration of the expander and the compressor cylinders, and the four-stroke configuration of the combustion cylinders). According to one embodiment, the internal combustion engine is referred to as a dual compression expansion engine, DCEE.

According to at least a second aspect of the present disclosure, the object is achieved by a vehicle. The vehicle comprises an internal combustion engine system according to the first aspect of the disclosure.

Effects and features of this second aspect of the present disclosure are largely analogous to those described above in connection with the first aspect of the disclosure. Embodiments mentioned in relation to the first aspect of the present disclosure are largely compatible with the second aspect of the disclosure.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS OF THE DISCLOSURE

Figure 1:
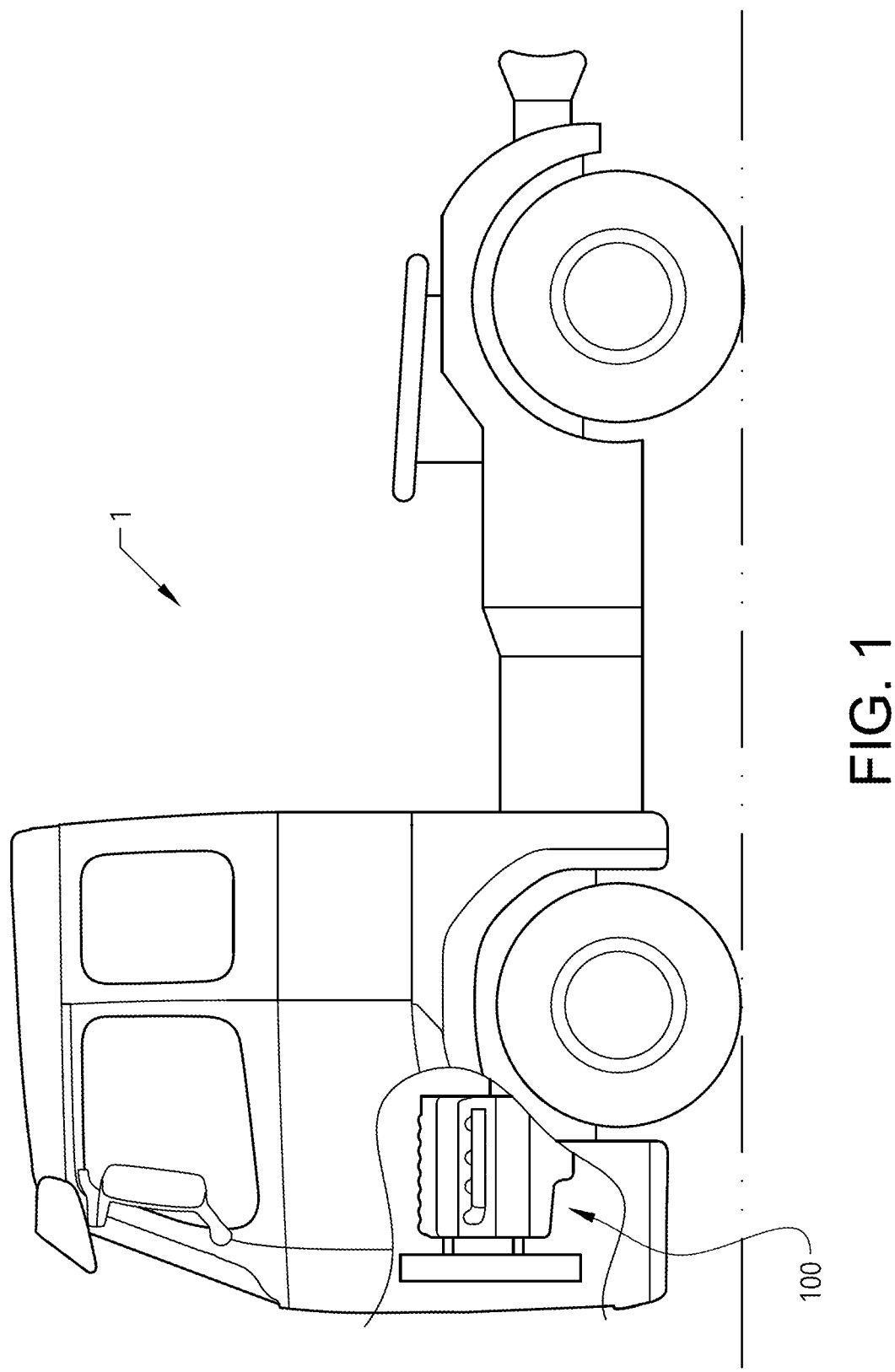
FIG. 1 is a side view of a vehicle comprising an internal combustion engine system according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1 with an internal combustion engine (ICE) system 100 according to the present disclosure. The vehicle 1 depicted in FIG. 1 is a truck for which the internal combustion engine system 100, which will be described in detail below, is particularly suitable for. The internal combustion engine system comprises at least a two-stroke piston machine, as will be further described in relation to FIGS. 2 to 5. Moreover, the internal combustion engine system 100 includes an internal combustion engine (ICE). In this example, the ICE system is a hydrogen piston ICE system. The combustion in such hydrogen ICE system is based on a combustion of air and hydrogen, as is commonly known in the art.

Figure 2:
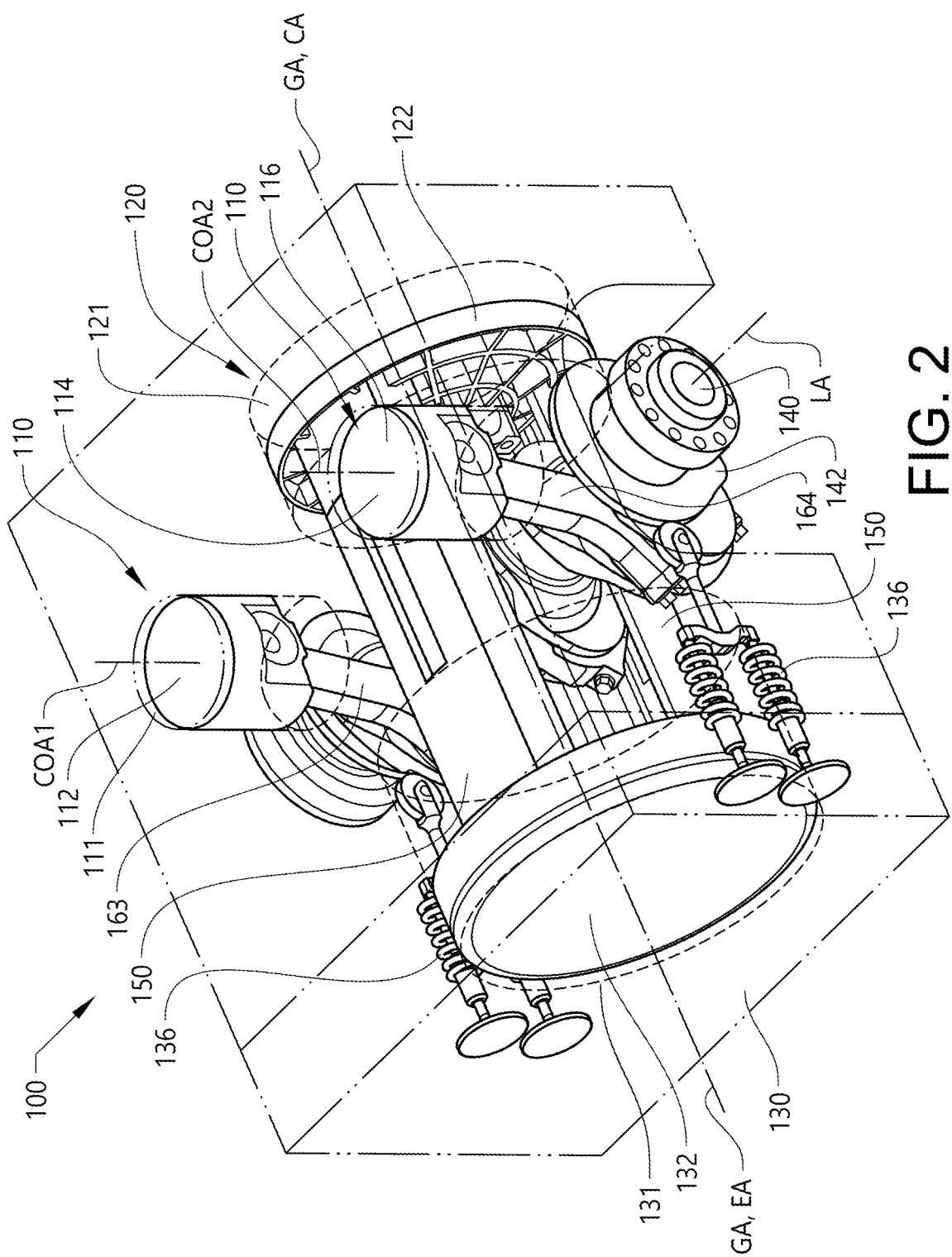
FIG. 2 is a perspective view of the internal combustion engine system according to an example embodiment of the present disclosure.
Figure 3:
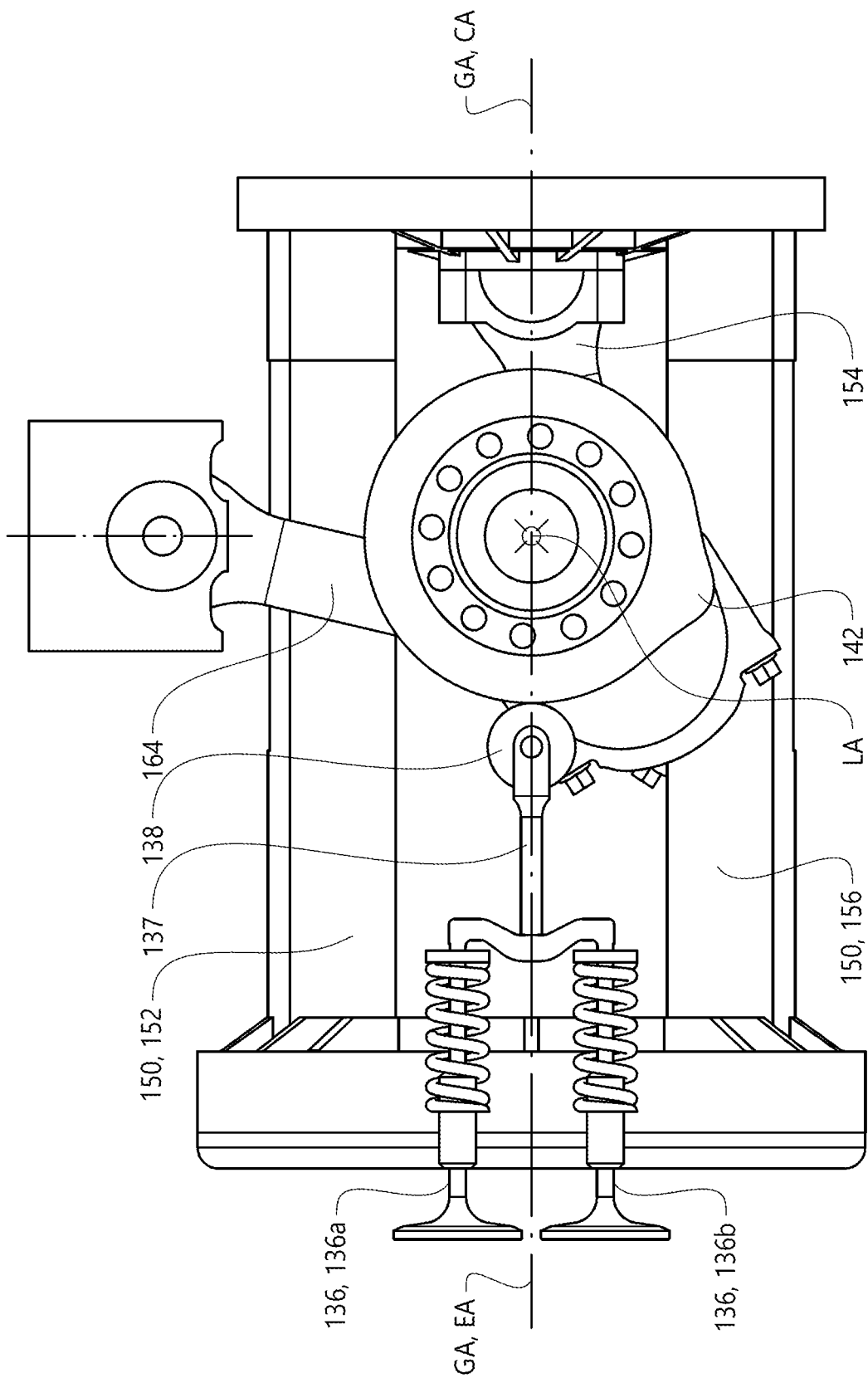
FIG. 3 is a side view of the internal combustion engine system of FIG. 2 according to an example embodiment of the present disclosure.
Figure 4:
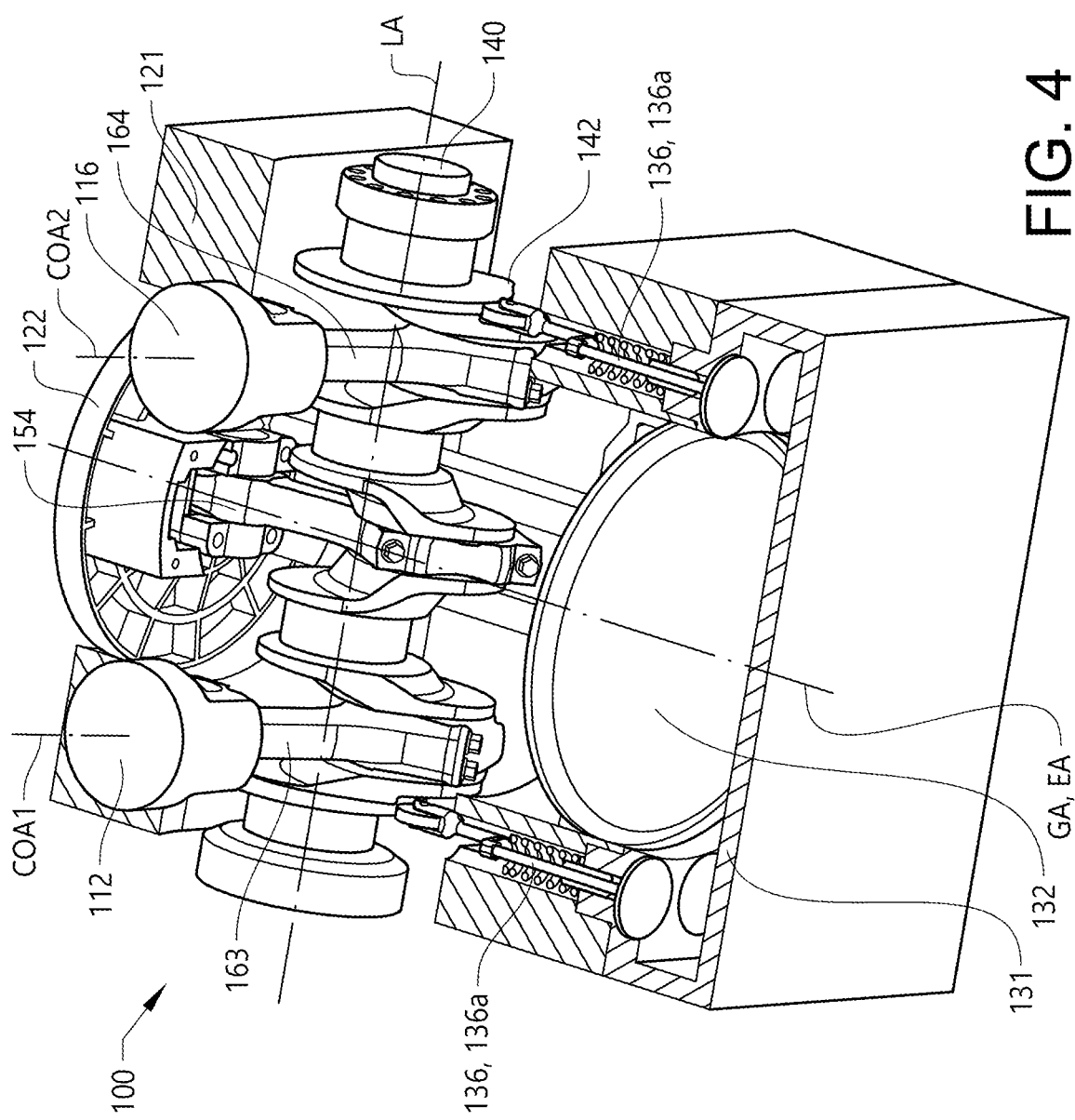
FIG. 4 is a cross-sectional perspective view of the internal combustion engine system of FIG. 2 according to an example embodiment of the present disclosure.

Turning to FIGS. 2 and 3, there is illustrated an internal combustion engine system 100 according to an example embodiment of the present disclosure. It should be noted a that full illustration of the cylinders housing the respective pistons have been omitted from FIGS. 2 and 3 for simplicity of understanding the disclosure and the piston configuration.

Hence, while it should be noted that the ICE system may include several cylinders, the internal combustion engine system 100 here comprises at least a piston combustor assembly 110 having at least one combustion cylinder 111 housing a first combustion piston 112, and a second combustion cylinder 114 housing a second combustion piston 116. The internal combustion engine system 100 further comprises a compressor 120 having a compressor cylinder 121 housing a compressor piston 122. Also, as depicted in FIG. 2, the ICE system 100 comprises an expander 130. In this example embodiment, the expander 130 corresponds to the two-stroke machine. In other words, the expander is one example of a two-stroke piston machine. The expander 130 comprises an expander cylinder 131 housing an expander piston 132. In this context, it should be noted that the term cylinder generally refers to a component having an interior space for accommodating a reciprocating piston, as is commonly known in the art.

Turning again to the combustor assembly 110, it should be understood that the first and second combustion pistons 112, 116 are individually arranged inside the first and second combustion cylinders 111, 114, respectively, and are adapted for reciprocating motion therein. Correspondingly, the compressor piston 122 and the expander piston 132 are arranged inside the compressor cylinder 121 and the expander cylinder 131, respectively, and are adapted for reciprocating motion therein.

Moreover, as shown in e.g. FIG. 2, the ICE system 100 comprises a crankshaft 140. As will be further described hereinafter, the crankshaft 140 is arranged to operate the expander piston 132. The crankshaft may operate the expander piston either directly via a corresponding piston connecting rod, or indirectly by one or more connecting elements. The crankshaft 140 is rotatable arranged around an axis of rotation, generally corresponding to a longitudinal axis $L_A$ of the crankshaft 140 (see FIG. 2). The rotatable crankshaft is arranged in the ICE system so as to cooperate with at least one valve of the expander 130 (i.e. the two-stroke piston machine). Accordingly, the expander 130 comprises at least one valve 136 for regulating a flow of fluid medium, such as exhaust gases received from the combustion cylinder(s).

Figure 5:
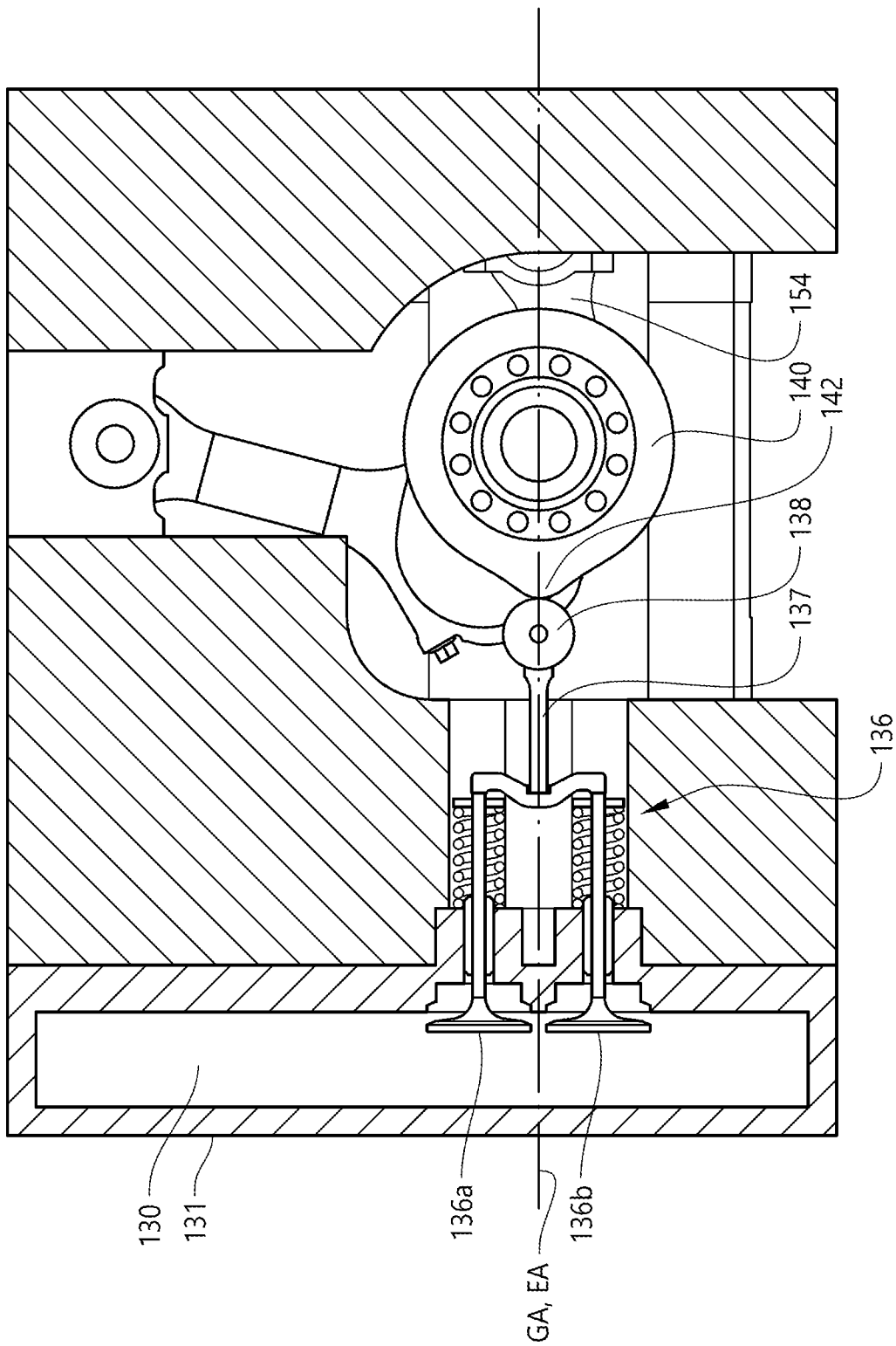
FIG. 5 is a cross-sectional side view of the internal combustion engine system of FIG. 2 according to an example embodiment of the present disclosure.

While the valve can be designed in several different manners to cooperate with the crankshaft, the crankshaft 140 typically has a cam lobe 142 for effecting a movement of the valve 136 upon rotation of the crankshaft 140 about the longitudinal axis LA. In this example, as illustrated in FIGS. 2 to 5, the integrated cam lobe 142 is integrally formed with the crankshaft 140. The cam lobe may thus generally be denoted as the integrated cam lobe. The cam lobe 142 is generally arranged on the crankshaft 140 so that a rotation of the crankshaft provides the cam lobe to operate the valve 136 between an open position and a closed position relative the expander 130. FIG. 5 illustrates the open position of the valve 136 relative the expander cylinder 131. As may be seen from FIG. 5, the valve 136 here comprises two conventional poppet valve units 136A and 136B. In addition, the valve 136 here comprises a valve extension member 137 connecting the valve 136 to a so-called cam follower 138. In other words, there is provided a valve 136 comprising a number of poppet valves 136A and 136B and a valve extension member 137 for cooperating with the cam lobe 142 of the crankshaft 140 via the cam follower 138. In this manner, the cam lobe 142 of the crankshaft is arranged to simultaneously operate a pair of intake valves 136 (136A and 136B) of the expander 130.

While not explicitly illustrated in the Figures, the crankshaft 140 may optionally have a plurality of integrated cam lobes for operating a number of valves, e.g. a number of intake valves of the expander.

Turning again to the arrangement of the crankshaft 140 and the valve 136 of the expander 130 as illustrated in FIGS. 2 to 5, the integrated cam lobe 142 is here arranged to mechanically operate the valve 136 of the expander 130. The operation of the valve 136 via the crankshaft 140 is provided by a rotation of the crankshaft 140 about the longitudinal axis LA. By having the cam lobe 142 arranged on the crankshaft 140 for rotation therewith, the cam lobe 142 is driven in rotation about the longitudinal axis of the crankshaft 140 and subsequently engages with an intermediate displaceable member in the form of a cam follower 138 that effect a displacement of the valve 136 relative the expander 130 (i.e. relative the expander cylinder 131). The intermediate member is configured to translate the rotational movement of the cam lobe 142 into a linear motion so as to effect actuation of the valve 136. Hence, by way of example, the integrated cam lobe 142 is arranged to mechanically operate the valve 136 by means of the cam follower 138 rotationally arranged between the integrated cam lobe and the valve. To this end, there is provided a simple, yet robust and compact operation of the valve by means of the crankshaft.

Typically, as illustrated in FIGS. 2 to 5, the cam lobe 142 of the crankshaft 140 is arranged to operate the intake valve of the expander 130. That is, the cam lobe 142 of the crankshaft 140 is arranged to operate the intake valve of the expander between the open position and the closed position so as to regulate the flow of exhaust gases into the expander cylinder. The intake valve is generally biased by a spring toward the normally closed valve position, and can be driven by means of the cam lobe on the crankshaft so as to overcome the biasing force of the spring toward the open valve position.

The arrangement of the valve relative the expander cylinder may be provided in several different ways. By way of example, as illustrated in FIGS. 2 to 5, the ICE system comprises a so-called side-valve two-stroke piston machine arrangement. That is, the expander 130 is arranged in a so-called side-valve arrangement. In such arrangement, the intake and exhaust valves are located at the side portions of the axis of the expander cylinder 131. Further, the intake valves 136 are opened and closed by the cam lobe 142 arranged on the crankshaft. Typically, the crankshaft 140 extends perpendicular to the expander, i.e. the longitudinal axis LA is arranged perpendicular to the axis of the expander EA.

As may be gleaned from FIGS. 2 to 5, and if the expander 130 is considered to be arranged in a vertical orientation relative a horizontal oriented crankshaft 140, the intake valve 136 of the expander 130 is a side valve arranged at a vertical side of the expander 130, whereby the cam lobe 142 of the crankshaft 140 is arranged to drive the vertical side valve of the expander 130.

In such arrangement, the inlet valve is located at a side portion of the expander cylinder 131. That is, the inlet valve 136 is located at a side portion of an axis of the cylinder of the expander, typically corresponding to the axis EA in FIGS. 2 to 5. Further, the side intake valve 136 is opened and closed by the integrated cam lobe 142 of the crankshaft 140, wherein the crankshaft 140 extends perpendicular to the axis EA of the cylinder of the expander, and thus perpendicular to the inlet valve 136 located at the side portion of the axis of the cylinder of the expander 130.

Analogously, in such side-valve expander arrangement, the exhaust valve of the expander is also typically located at a side portion of the expander cylinder.

Turning again to some of the other components of the ICE system, the ICE system 100 generally comprises a compression piston connecting rod 154 (most clearly shown in FIG. 3) connecting the compression piston 122 to the crankshaft 140, as illustrated in FIGS. 2 to 5. Further, as shown in FIGS. 2 and 3, the expander piston 132 is connected to the compressor piston 122 by a connecting element assembly 150. Alternatively, although not shown, the ICE system comprises an expander piston connecting rod connecting the expander piston 132 to the crankshaft 140. In this example, the expander piston 132 may still also be connected to the compressor piston 122 by a similar connecting element assembly.

Correspondingly, as illustrated in FIGS. 2 to 5, a first combustion piston connecting rod 163 connects the first combustion piston 112 to the crankshaft 140, and a second combustion piston connecting rod 164 connects the second combustion piston 114 to the crankshaft 140. Thus, the above-mentioned reciprocating motions of the pistons can be transferred into a rotational motion of the crankshaft 140.

By way of example, as illustrated in e.g. FIG. 3, the expander piston 132 is connected to the compressor piston 122 by the connecting element assembly 150 in the form of two connecting arms 152, 156 arranged in a respective periphery portion of the expander and compressor pistons 132, 122. Each one of the connecting arms 152, 156 typically extends from the expander piston 132 to the compressor piston 122, respectively. Even though two connecting arms 152, 156 are shown in FIG. 3, it should be understood that other number of connecting arms, or only one connecting arm, may be used within the concept of the disclosure. Moreover, the connecting element assembly 150 may be arranged with no connecting arms, but instead as e.g. a connecting envelope extending from the expander piston 132 to the compressor piston 122, such that the expander piston 132 and the compressor piston 122 move in unison. As such, the connecting element assembly 150 should be rigidly connected the expander piston 132 to the compressor piston 122, such that the expander piston 132 and the compressor piston 122 move in unison. By way of example, the connecting element assembly 150 rigidly connects the expander piston 132 with the compressor piston 122 such that when the compressor piston 122 moves in a downstroke (i.e. in order to compress the air in the compressor cylinder 121), the expander piston 132 moves in a stroke following the motion of the compressor piston 122. Correspondingly, as the expander piston 132 moves in an upstroke, the compressor piston 122 moves in a stroke following the motion of the expander piston 132.

As shown in FIGS. 2 to 5, the compressor cylinder 121 and the expander cylinder 132 are positioned on opposite sides of, and in close proximity to, the crankshaft 140. Stated differently, a substantial portion of the crankshaft 140 is generally arranged in between the expander piston 132 and the compressor piston 122, such that the substantial portion of the crankshaft is arranged between respective crankshaft facing surfaces of the compression piston and the expander piston, as illustrated in e.g. FIG. 2. In other words, the compressor piston 122, the expander piston 132 and the substantial portion of the crankshaft 140 are arranged along a geometrical axis GA, and the substantial portion of the crankshaft 140 is arranged along the geometrical axis GA in between the compressor piston 122 and the expander piston 132. In this manner, there is provided a so-called compressor-expander arrangement enclosing a substantial portion of the crankshaft 140. The internal position of the components in the ICE system 100 may be described in a different manner.

In at least a third way of describing the internal position of the components in the ICE system 100, the expander piston 132 has a circular, or round, cross section extending in a first geometrical plane, and the compressor piston 122 has a circular, or round, cross section extending in a second geometrical plane, the first and second geometrical planes being positioned in a parallel configuration on opposite sides of the longitudinal axis LA of the crankshaft 140.

As seen best in FIG. 2, or FIG. 3, the expander piston 132 is configured for a reciprocating motion inside of the expander cylinder 131 along the expander axis EA. Correspondingly, the compressor piston 122 is configured for a reciprocating motion inside of the compressor cylinder 121 along a compressor axis CA. Correspondingly, the first combustion piston 112 is configured for a reciprocating motion inside of the first combustion cylinder 111 along a combustion axis CoA1, and the second combustion piston 116 is configured for a reciprocating motion inside of the second combustion cylinder 114 along a combustion axis CoA2. As seen in e.g. FIG. 2, the expander cylinder 130 and the compressor cylinder 120 are co-axially arranged, i.e. the expander axis EA and the compressor axis CA are aligned.

Turning back to FIG. 2, it is shown that the first combustion cylinder 111, and the second combustion cylinder 114 may be described as protruding laterally from the crankshaft 140 compared to the expander cylinder 130. Thus, the expander cylinder 130, and the first and second combustion cylinders 111, 114 are arranged inside the ICE system 100 in such way that the expander axis EA is angled in relation to each one of the combustion axis CoA1, CoA2 by between 40 degrees and 90 degrees, preferably between 50 degrees and 75 degrees, and more preferably between 55 degrees and 65 degrees, such as e.g. about 60 degrees.

The function of the ICE system 100 will now be further elucidated with reference to FIG. 2. The compressor cylinder 120 is configured to draw a volume of ambient air, compress the air, and transfer the compressed air to the first and second combustion cylinders 111, 114. The first and second combustion cylinders 111, 114 are configured to be energized by forces of combustion, e.g. by ignition of the fuel by means of a spark plug (e.g. as for a petrol or gasoline driven engine) or heat originating from compression (e.g. as for a diesel driven engine). The expander cylinder 130 is configured to receive exhaust gases from the first and second combustion pistons 112, 116. The generated exhaust is typically fed via an exhaust passage to the expander, where the pressure and temperature of the exhaust reduce during expansion thereof. Transportation of air, fuel and gases are carried out by means of inlet valves, transfer ports, and outlet valves known by the skilled person in the art, and which fluidly interconnects the compressor cylinder 121, the first and second combustion cylinders 111, 114 and the expander cylinder 131.

In one example, the crankshaft is driven by at least one of the combustion pistons by means of a corresponding combustion piston connecting rod, and is driven by the expander piston by means of a corresponding expander piston connecting rod, wherein the compressor piston is driven by the crankshaft by means of the expander piston.

However, a slightly opposite arrangement may also be possible, which is also illustrated in the ICE system in FIGS. 2 to 5. That is, the expander piston 132 is not directly connected to the crankshaft 140, via its own connecting rod, but is instead connected to the crankshaft 140 via the connecting element assembly 150, the compressor piston 122 and the compressor piston connecting rod 154. Hereby, the rotational motion of the crankshaft 140 is transferred into a reciprocating motion of the expander piston 132 via the compressor piston connecting rod 154. Thus, the crankshaft 140 is driven by the first and second combustion pistons 112, 116 by means of the respective combustion piston connecting rods and is driven by the compressor piston by means of the compressor piston connecting rod 154, but the crankshaft 140 drives the expander piston 132 by means of the compressor piston 122 and the compressor piston connecting rod 154.

It is to be understood that the present disclosure is not limited to the embodiments described above and illustrated in the drawings; rather, the skilled person will recognize that many changes and modifications may be made within the scope of the appended claims.

The invention claimed is:

1. An internal combustion engine system, comprising an expander for expanding exhaust gases arising from a combustion reaction of the ICE system, said expander having an expander cylinder for accommodating a reciprocating expander piston, and further at least one valve for regulating a flow of fluid medium; the ICE system further comprising a rotatable crankshaft for operating the reciprocating expander piston, wherein the rotatable crankshaft comprises an integrated cam lobe arranged to operate the at least one valve of the expander.

2. The internal combustion engine system according to claim 1, wherein the integrated cam lobe is arranged to mechanically operate the at least one valve of the expander.

3. The internal combustion engine system according to claim 1, wherein the at least one valve is an intake valve of the expander and the integrated cam lobe of the crankshaft is arranged to operate the intake valve of the expander.

4. The internal combustion engine system according to claim 3, wherein the integrated cam lobe of the crankshaft is arranged to simultaneously operate a pair of intake valves of the expander.

5. The internal combustion engine system according to claim 3, wherein the intake valve of the expander is a side valve arranged at a side of the expander piston, whereby the integrated cam lobe of the crankshaft is arranged to drive the side valve of the expander.

6. The internal combustion engine system according to claim 1, further comprising at least one combustion cylinder housing a combustion piston, the combustion cylinder being configured to be energized by forces of combustion; a compressor cylinder housing a compressor piston, the compressor cylinder being configured to compress a volume of air and transfer the compressed air to the at least one combustion piston; the expander cylinder being configured to receive exhaust gases from the at least one combustion piston;

wherein the crankshaft is connected to the at least one combustion piston and any one of the expander piston and the compressor piston by a respective connecting rod.

7. The internal combustion engine system according to claim 6, wherein the crankshaft is driven by the at least one combustion piston by means of the combustion piston connecting rod, and is driven by the expander piston by means of the expander piston connecting rod, wherein the compressor piston is driven by the crankshaft by means of the expander piston.

8. The internal combustion engine system according to claim 6, wherein the expander piston has a circular cross section extending in a first geometrical plane, and the compressor piston has a circular cross section extending in a second geometrical plane, the first and second geometrical planes being positioned in a parallel configuration on opposite sides of a longitudinal axis of the crankshaft.

9. The internal combustion engine system according to claim 6, wherein the expander cylinder and the compressor cylinder are co-axially arranged.

10. The internal combustion engine system according to claim 1, wherein the crankshaft comprises a plurality of integrated cam lobes for operating a number of intake valves.

11. A vehicle comprising an internal combustion engine system according to claim 1.

* * * * *